US007577845B2

(12) United States Patent
Ma

(10) Patent No.: US 7,577,845 B2
(45) Date of Patent: Aug. 18, 2009

(54) INFORMATION MATRIX CRYPTOGRAM

(76) Inventor: Hengli Ma, 39120 Argonaut Way, #520, Fremont, CA (US) 94538

( * ) Notice: Subject to any disclaimer, the term of this patent is extended or adjusted under 35 U.S.C. 154(b) by 530 days.

(21) Appl. No.: 10/919,508

(22) Filed: Aug. 17, 2004

(65) Prior Publication Data

US 2006/0041762 A1 Feb. 23, 2006

(51) Int. Cl.
*H04L 9/32* (2006.01)
(52) U.S. Cl. ....................................... 713/181
(58) Field of Classification Search .................. 713/181
See application file for complete search history.

(56) References Cited

U.S. PATENT DOCUMENTS

| 4,322,577 | A  | * | 3/1982  | Brandstrom    | 380/37  |
|-----------|----|---|---------|---------------|---------|
| 5,533,127 | A  | * | 7/1996  | Luther        | 380/28  |
| 5,963,642 | A  | * | 10/1999 | Goldstein     | 713/193 |
| 6,611,599 | B2 | * | 8/2003  | Natarajan     | 380/203 |
| 7,412,054 | B2 | * | 8/2008  | Ghaffar et al.| 380/28  |
| 2003/0154378 | A1 | * | 8/2003 | Hirano       | 713/176 |
| 2004/0062390 | A1 | * | 4/2004 | Slavin       | 380/30  |
| 2004/0123102 | A1 | * | 6/2004 | Gehrmann et al.| 713/161 |
| 2004/0136535 | A1 | * | 7/2004 | Takeuchi     | 380/256 |
| 2004/0174995 | A1 | * | 9/2004 | Singh        | 380/30  |
| 2005/0097361 | A1 | * | 5/2005 | Apostolopoulos et al. | 713/201 |
| 2005/0210260 | A1 | * | 9/2005 | Venkatesan et al. | 713/180 |

OTHER PUBLICATIONS

Love, John. Clarification of "Processes" under 35 USC 101. May 15, 2008. USPTO. p. 1-2.*

* cited by examiner

*Primary Examiner*—Christian LaForgia
(74) *Attorney, Agent, or Firm*—Anthony J. Bourget

(57) ABSTRACT

In accordance with the present invention, there is provided a concept of the present invention is to use technology and methods of a special coded information matrix cryptogram with five integrated technologies to protect the original digital data from forgery, counterfeiting and pirating effectively. Five technologies comprise of data matrix bitmap technology, compression technology, encryption technology, data allocating technology and authentication technology. They can enhance the information matrix cryptogram with the special features to the strongest level of security.

The concept of designing the system of the present invention is to be able to convert any data in any kind of formats and size into a special formatted and coded information matrix cryptogram. This cryptogram with a special authentic code is unique and infeasible to break. The design of the open technology of the present invention allows the user to have flexible applicable options to protect the any data in any kind of format in a very safe and secure way.

20 Claims, 16 Drawing Sheets

Figure 1. Structure of the System of Information Matrix Cryptogram
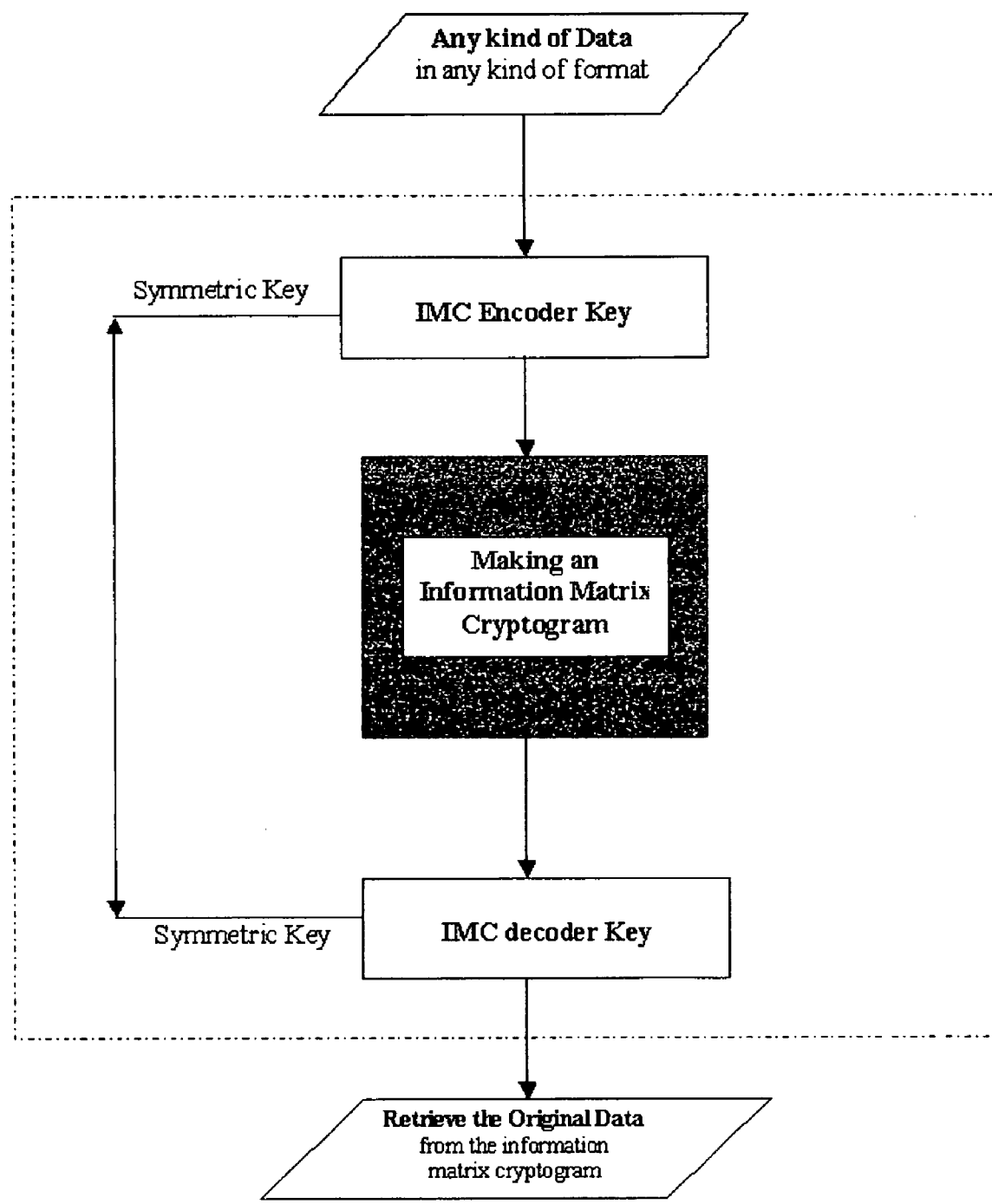

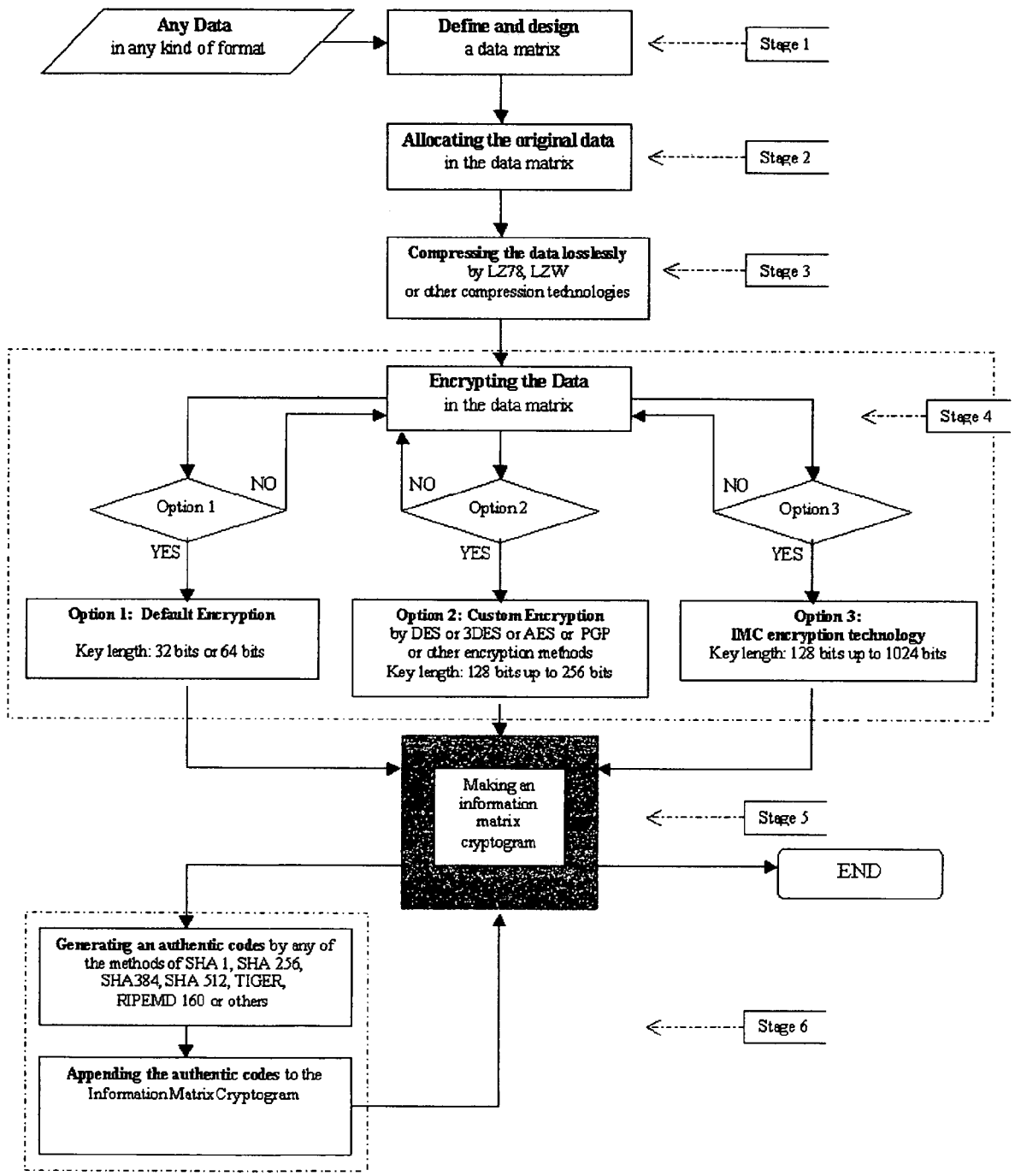
Figure 2. Flowchart of Making of the Information Matrix Cryptogram

Figure 3. Sample diagrams of the Size of the Data Matrix

1. Default Size of the Data Matrix for data file of 1 byte to 1 Kilobyte

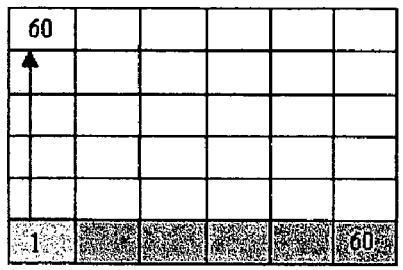

3600 cells can store 1800 bytes in total. The size of a data file should be no more than 1024 bytes when using this data matrix.

2. Medium Size of the Data Matrix for data file of 1 kilobyte to 3 Megabyte

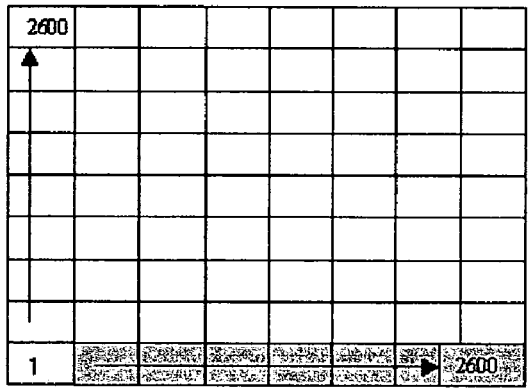

6,760,000 cells can store 3,380,000 bytes in total. The size of a data file should be no more than 3 megabytes (3,145,728 bytes) when using this data matrix.

3. Large Size of the Data Matrix for data file of over 5 Megabytes

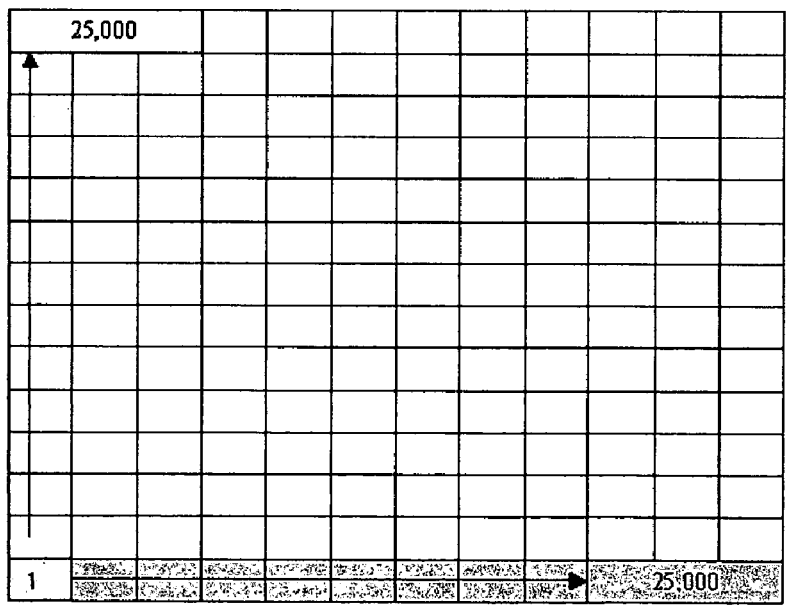

6.25 million cells can store about 298 megabytes in total. The size of a data file should be no more than 3 megabytes (3.125 million bytes) when using this data matrix.

Figure 4a Layout of the Data Matrix for the Information Matrix Cryptogram

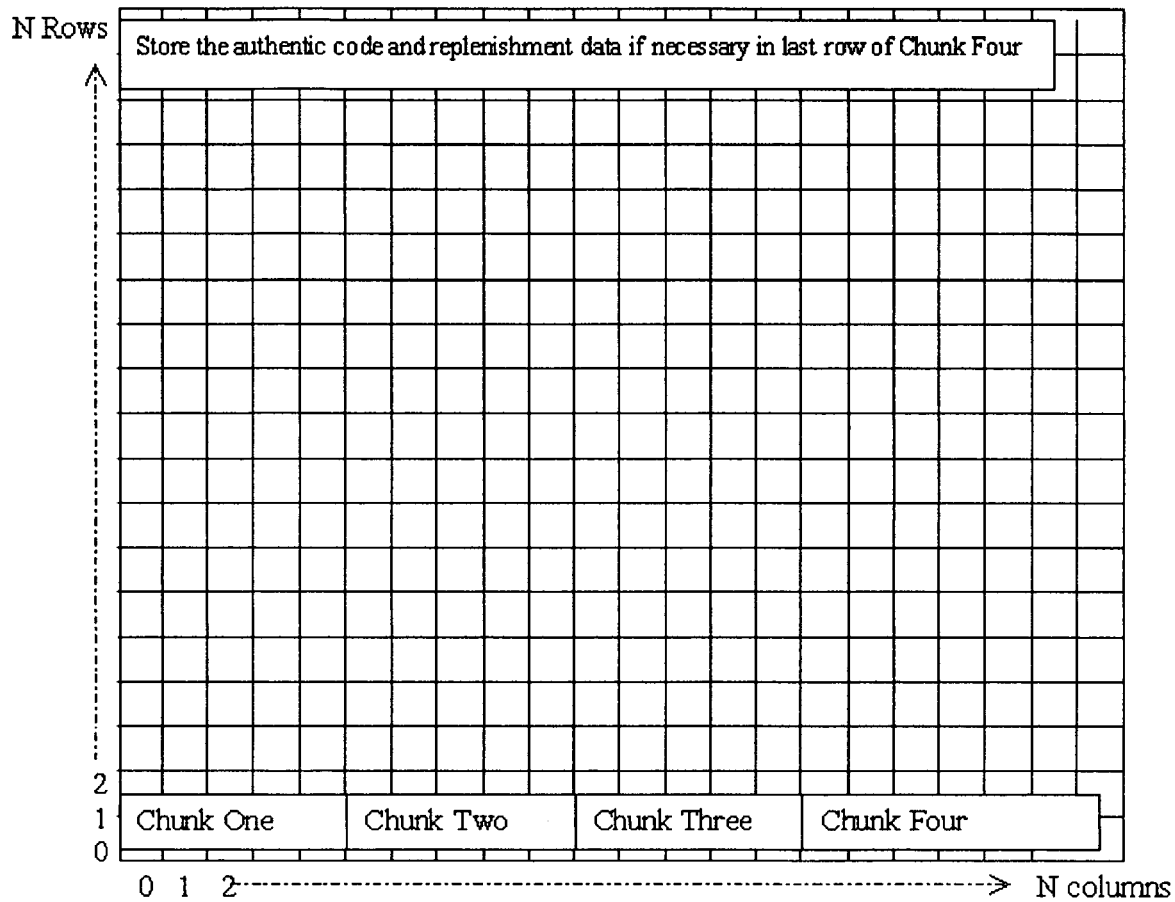

Note:
1. Size of the Data Matrix:
   Minimum Size: 60 x 60: 3600 cells in this data matrix
   Maximum Size: no limit. Decided by the size of the original data
2. 4 bits in one cell, 1 byte takes two cells
3. Chunk One: data matrix FILEHEADER, corresponding bytes: 14 bytes
4. Chunk Two: data matrix INFOHEADER, corresponding bytes: 40 bytes
5. Chunk Three: Color Index Table, corresponding bytes: 256 bytes
6. Chunk Four: Storing Data. This is a big chunk for the whole data file
7. Last row for storing an authentic code Figure 4b. Structure of the Data Matrix FILEHEADER

Chunk One: 14 bytes in total

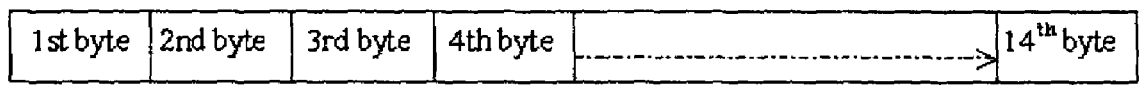

First 2 bytes (bfType): two characters "BM" as bitmap

| Type of the data matrix |
|---|

Second 4 bytes (bfSize): Decides the entire data file's size

| Size of the data matrix |
|---|

Third 4 bytes (bfReserved1 and bfReserved2): reserved spaces
    (2 bytes for bfReserved1 and 2 bytes for bfReserved2)

| Spaces of the data matrix (set to zero) |
|---|

Fourth 4 bytes (bfOffBits): Describes the number of bytes

| Byte offset from the beginning of the data file at which the data starts |
|---|

Figure 4c. Structure of the Data Matrix INFOHEADER

Chunk Two: 40 bytes in total

| 1st byte | 2nd byte | 3rd byte | 4th byte | 40th byte |
|---|---|---|---|---|

First 4 bytes (biSize):

Size of the BITMAP INFOHEADER structure

Second 4 bytes (biWidth):

Width of the data matrix in pixels

Third 4 bytes (biHeigth):

height of the data matrix in pixels

Fourth 2 bytes (biPlanes):

Number of planes in the data matrix (set to 1)

Fifth 2 bytes (biBitCount):

Depth of the data matrix (4 bits for 1 color)

Sixth 4 bytes (biCompression):

Run Length Encoding to compress the data matrix

Seventh 4 bytes (biSizeImage):

Length of the matrix image data (actual pixels) in bytes

Eighth 4 bytes (biXPelsPerMeter) and Nineth 4 bytes (biYPelsPerMeter):

Resolution of the data matrix in pixel per meter (set to zero)

Tenth 4 bytes (biClrUsed):

Number of colors of color table are used (set to zero)

Eleventh 4 bytes (biClrImportant):

Which colors are most important are actually used (set to zero); increase displaying speed Figure 4d Structure of the Color Table and the Color Index Array of the Data Matrix

Chunk Three: 256 bytes in total

This is only a diagram indicating how a color table looks like with four colors

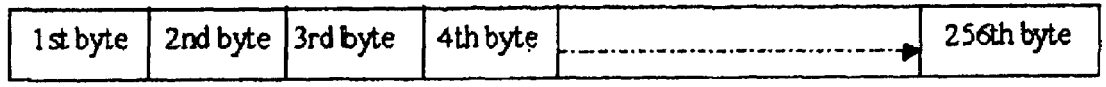

A demo diagram indicating the color table structure usually looks like as the following:
(1 cell with 4 bits index 16 colors)

In the present invention, one cell only stores 1 color, the following demo diagram shows:

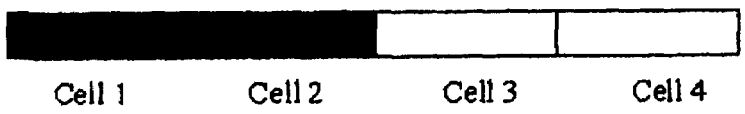

The following demo diagram presenting colors in a data matrix cryptogram look like:

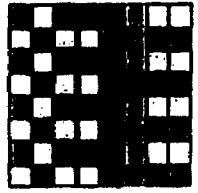

Note:

An array of Color Table structures follows the data matrix information header structure, and this color table is followed by a second array of indexes into the color table. The color-index array associates a color, in the form of an index to a Color Table structure, with each pixel in a data matrix. Thus the number of bits in the color-index array equals the number of pixels times the number of bit needed to index the Color Table.

In the data matrix of the present invention is a 32 x 32 matrix with 4 colors, its color index array is 32 x 32 x 1 = 1024 bits. (4 bits indexes 1 color).

However, in the present invention, color is a minute factor. Less colors or more colors will not affect the nature of the information matrix cryptogram at all. In order to control size of cryptogram effectively, the present invention tries to use as less colors as necessary. Colorful data matrix gives pleasant vision effect, but in fact, the black and white data matrix is acceptable too.

Figure 4e. Data Allocation in the Data Matrix

Chunk Four: no size limit

| 1st byte | 2nd byte | 3rd byte | 4th byte | ----------------> | No size limit |

The Sample Diagram of the Data Allocation

| Last remained cells for an authentic code | | | | | Cell for Replenishment Data | | | Cell N |
|---|---|---|---|---|---|---|---|---|
| | | | | | | | | |
| | | | | | | | | |
| | | | | | | | | |
| | | | | | | | | |
| | | | | | | | | |
| Cell 45 | Cell 44 | Cell 43 | Cell 42 | Cell 41 | Cell 40 | Cell 39 | Cell 38 | Cell 37 |
| Cell 36 | Cell 35 | Cell 34 | Cell 33 | Cell 32 | Cell 31 | Cell 30 | Cell 29 | |
| Cell 19 | Cell 20 | Cell 21 | Cell 22 | Cell 23 | Cell 24 | | | |
| Cell 18 | Cell 17 | Cell 16 | Cell 15 | Cell 14 | Cell 13 | Cell 12 | Cell 11 | Cell 10 |
| Cell 1 | Cell 2 | Cell 3 | Cell 4 | Cell 5 | Cell 6 | Cell 7 | Cell 8 | Cell 9 |

Note:
1. 4 bits per cell, 1 byte takes 2 cells
2. Cell 1 - Cell 8 (4 bytes) stores number of rows of the data matrix
3. Cell 9 - Cell 16 (4 bytes) stores number of columns of the data matrix
4. Cell 17 - Cell 24 (4 bytes) stores number of cells in the last row.
5. Cell 25 - Cell 28 (2 bytes) stores number of total number of used cells for filename and the information of the user's computer profile
6. Cell 34 – Cell 35 (1 byte) stores number of the characters of filename
7. Cell 41 – Cell 42 (1 byte) stores number of the characters of the computer system profile
8. Last 40 cells of the last row (20 bytes) store the authentic code
9. The rest cells in Chunk 4 store the actual data, no size limit.

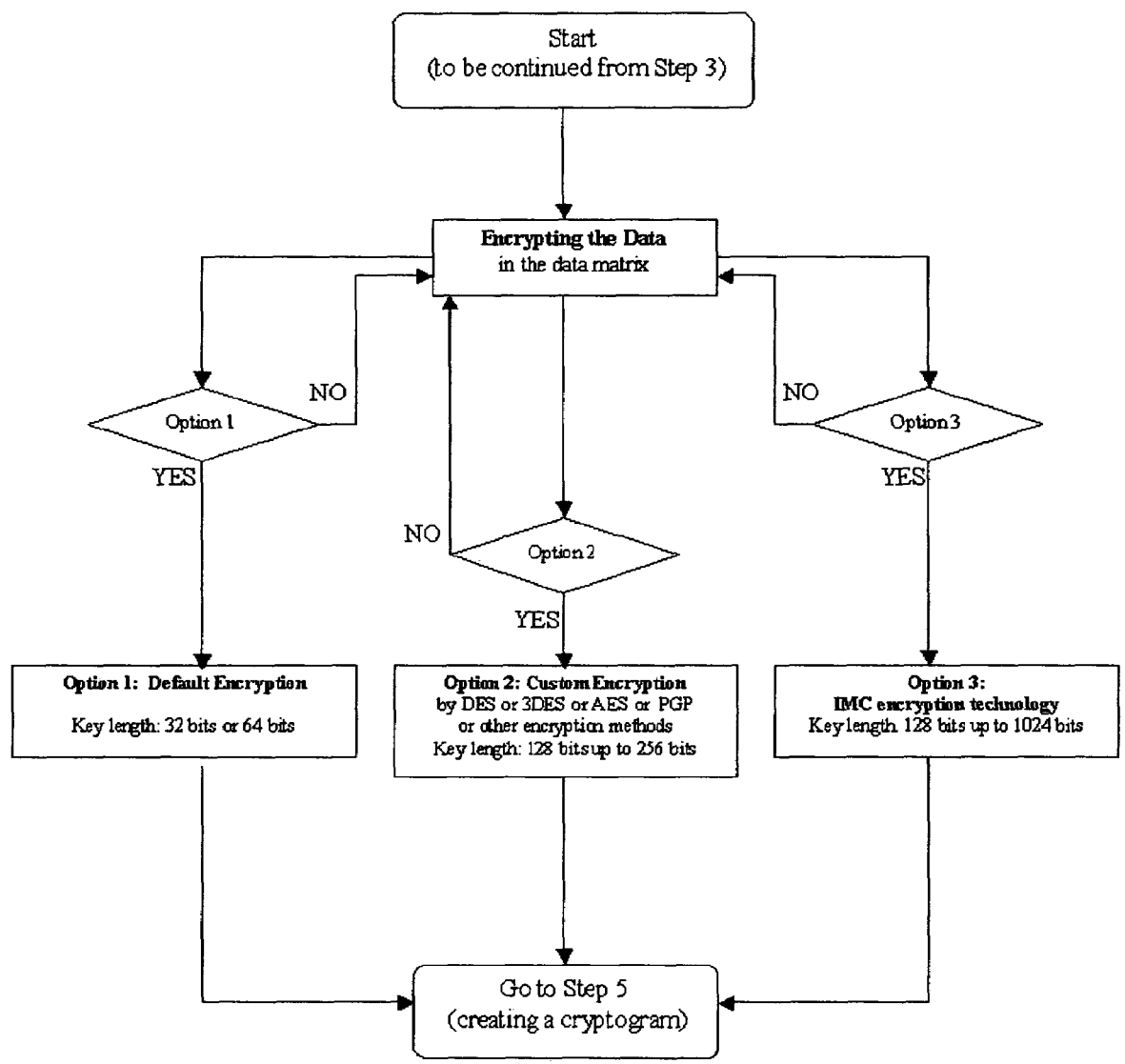
Figure 5a. Options of Three Types of Encryption Methods

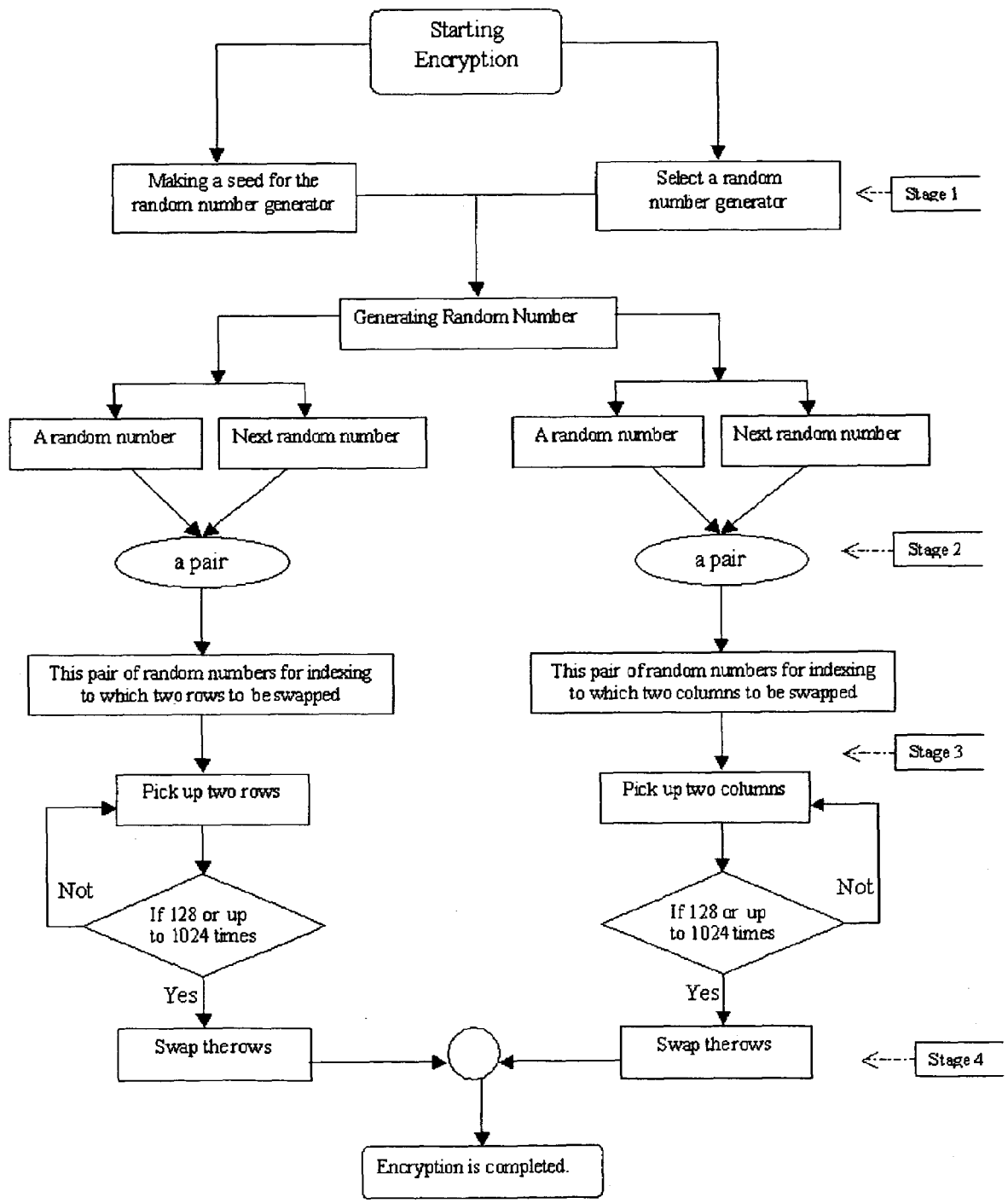
Figure 5b. Flowchart of Encrypting a Data Matrix

Figure 5c. Sample diagram of the Allocation of the Encrypted Data in the Matrix before and after Swapping Take a 10 x 10 data matrix as an example to explicate how the data is reallocated in the data matrix after random swapping.

Before Swapping:

After Swapping: (This is only a sample demo of data in the data matrix after swapping. Actually the rows and the columns of the data in the data matrix will be swapped at least 128 times and up to 1024 times randomly and respectively)

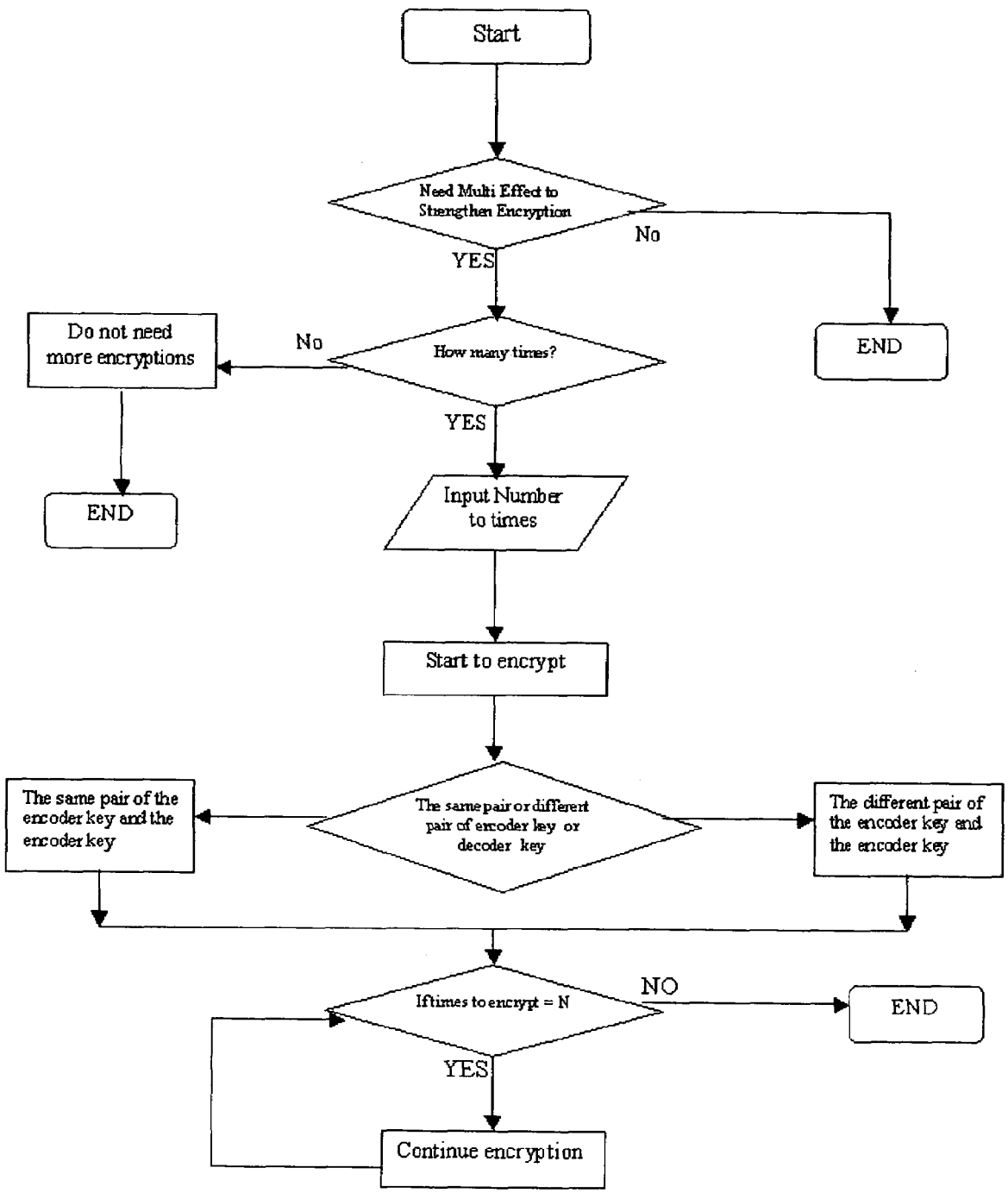
Figure 6. Flowchart of the Multi Effect of Strengthening Encryption

Figure 7. Flowchart of Generating an Authentic Code
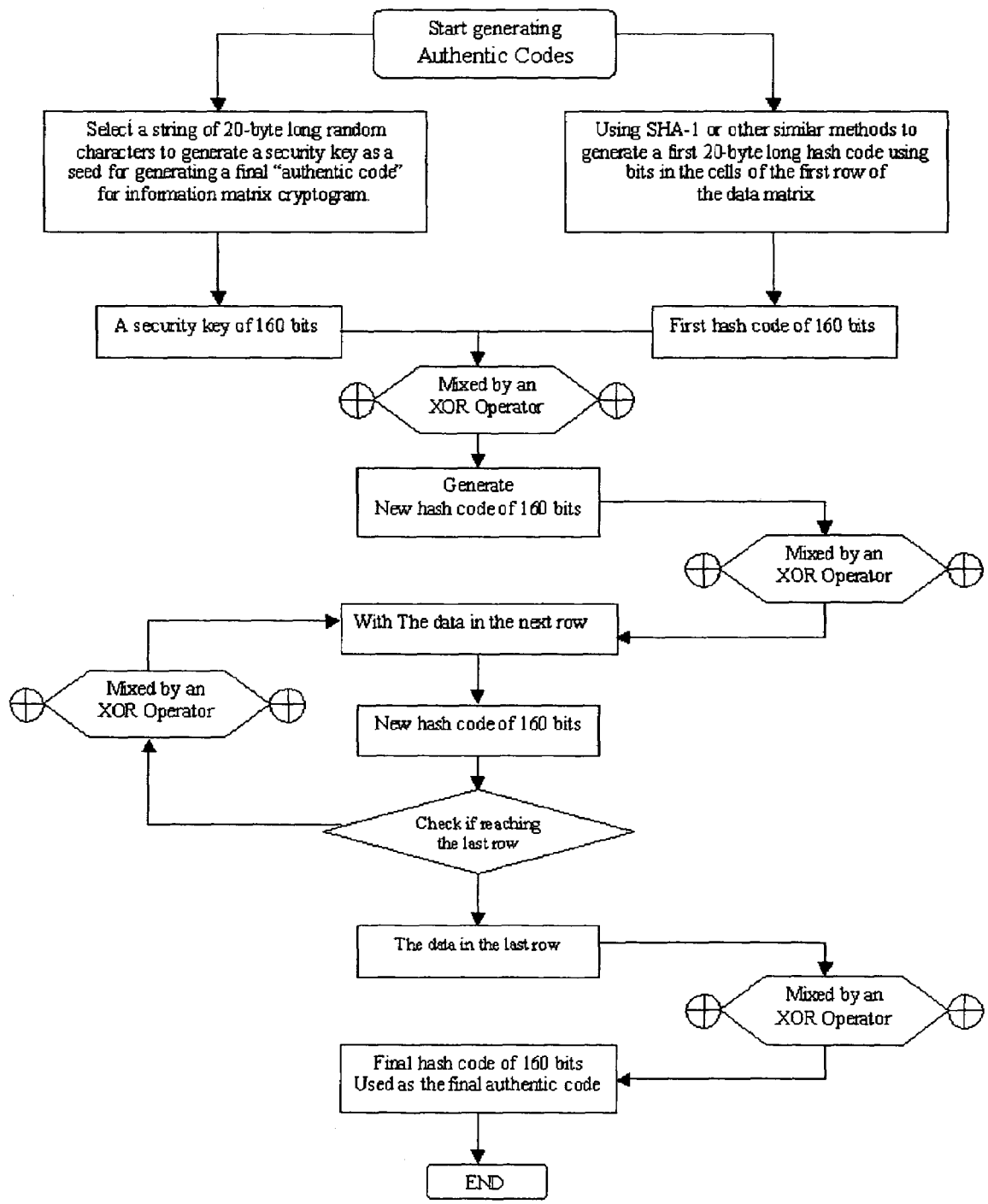

Figure 8. A Set of the Multi Security Key Systems of the Encoder and the Decoder
A. The Layout of a Set of the Multi Security Key Systems of the Encoder and the Decoder
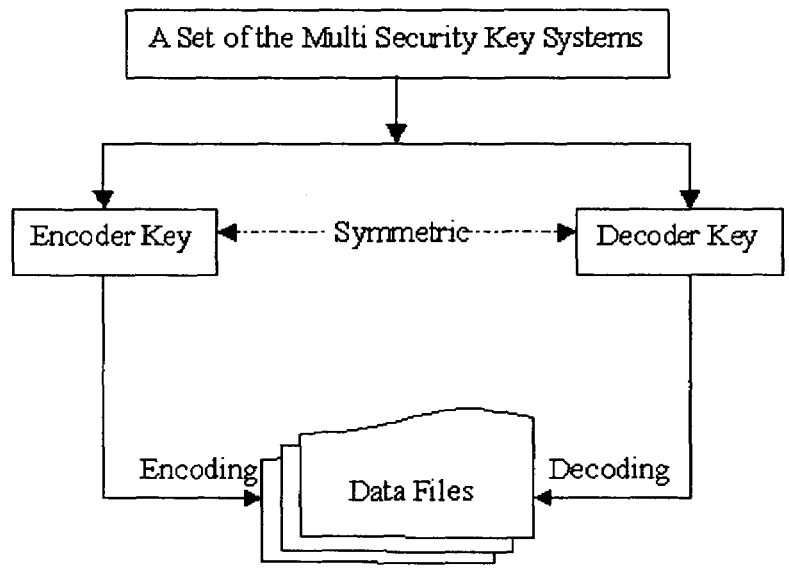
B. One-to-Many Security Key System for general use (Default)
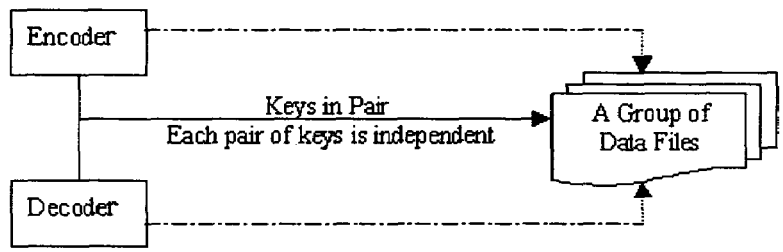
C. One-to-One Security Key System for top confidential data file
D. Associated Security Key System for use of anti-piracy and other special purpose
FIGURE 9
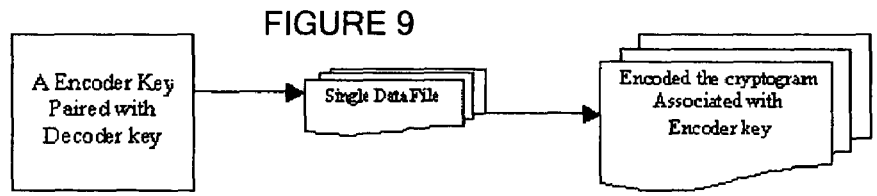

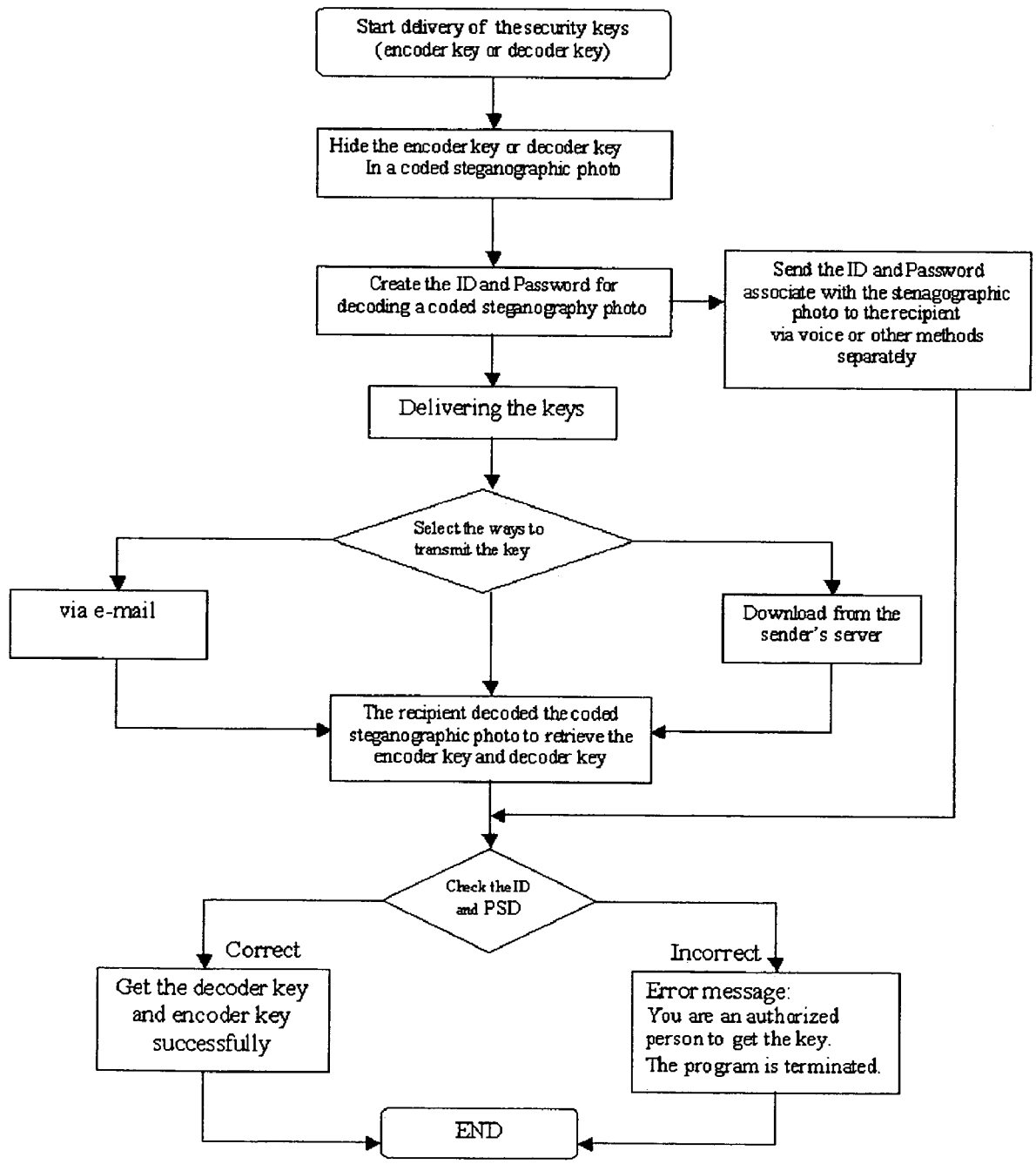
Figure 9. Flowchart of Delivering the Security keys of the encoder and the decoder

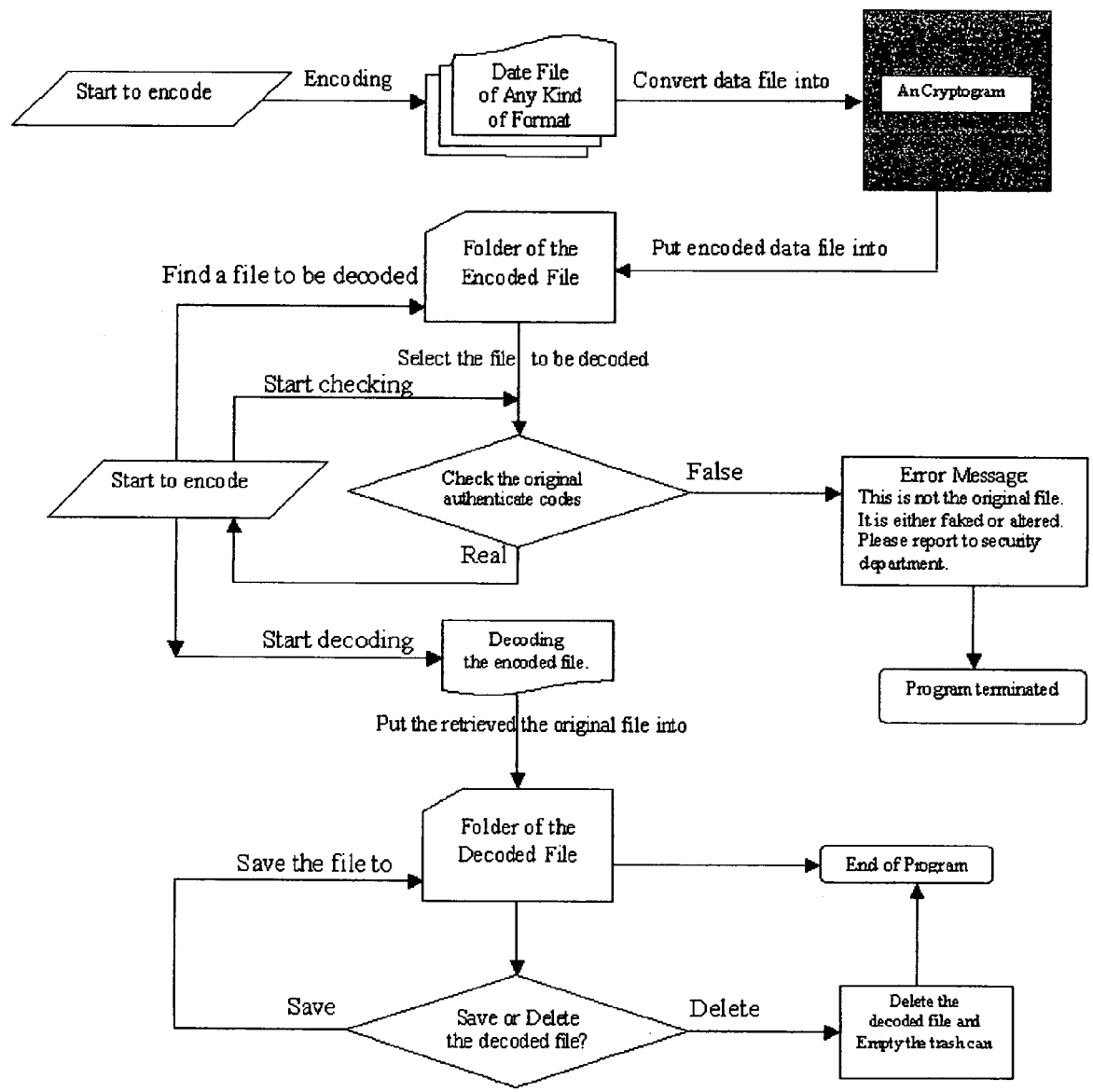
Figure 10. Flowchart of How Security Key System Works

INFORMATION MATRIX CRYPTOGRAM

FIELD OF THE INVENTION

The present invention relates to a system for anti-forgery, anti-counterfeiting, anti piracy, authentication and verification and, more particularly, the present invention relates to a system by integrating five technologies comprising of data matrix technology, compression technology, encryption technology, data allocating technology, authentication technology in a sophisticated way. The proprietary concept and technologies of the present invention are able to convert any data file in any kind of format without the loss of its any original information and the size limit into a special coded information matrix cryptogram. The information matrix cryptogram with a special authentic code is infeasible to break and designed for protecting any data in any kind of format in a very safe and secure way.

BACKGROUND OF THE INVENTION

In the digital era, the fast developing digital technology is like a double edge sword. On one hand, it gives the people a powerful tool to make life easier and work more efficient, but unfortunately on the other hand, it also provides the criminal with a powerful tool to commit crimes in more sophisticated ways.

Today every company depends on its databases, networks, and connection to the Internet to create, store, and transfer information. Internal and external communication is the basis for most business processes, and within this communication there is an inherent risk of fraud and forgery. Today, every document that contains information can be forged or manipulated by using digital technologies and methods. The criminal activities of counterfeiting, piracy and fraud are on the rise due to readily available software, inexpensive printing and imaging technologies are used to create fraudulent documents or alter digital images. The crimes of forgery, counterfeiting and piracy have brought serious negative impact on human life and business with huge economic loss. These crimes have become even worse since the early 20th century. By one industry estimate, more than 1,000 people a day in the United States fall victim to crimes of stolen identity. According to the Privacy Rights Clearinghouse, there are over 400,000 thefts of identity each year with annual losses of more than $2 Billion. Besides forgery products, piracy of copyright and counterfeiting documents are another major problems for the time being. The amount of money that consumers are also losing due to Internet fraud is increasing seriously. Reducing the number of incidences and severity of fraud becomes a prerequisite for success for companies of all sizes.

It is difficult to learn how to protect the high value and confidential data in a computer system effectively than to break into it. It is really a great challenge to find an ultimate solution with digital high technology to be able to prevent from crimes of forgery, counterfeiting and piracy that unsecured digital technology allows.

For the time being, there are many kinds of technology and apparatus in the fields of anti counterfeiting, encryption and authentication, such as "Ciphering and deciphering device" (U.S. Pat. No. 4,972,481, issued on Nov. 20, 1990); "Encrypting conversion apparatus, decrypting conversion apparatus, cryptographic communication system, and electronic toll collection apparatus" (U.S. Pat. No. 6,683,956, issued on Jan. 27, 2004); "Method for the secure handling of monetary or value units using prepaid data carriers" (U.S. Pat. No. 6,745,940, issued on Jun. 8, 2004); "Certification apparatus and method" (U.S. Pat. No. 6,748,530, issued on Jun. 8, 2004); "Cryptographic apparatus and methods (U.S. Pat. No. 4,200,700, issued on Apr. 29, 1980); "Method and computer program product for hiding information in an indexed color image" (U.S. Pat. No. 6,519,352, issued on Feb. 11, 2003); "Large capacity steganography" (U.S. Pat. No. 6,473,516 issued on Oct. 29, 2002); "Computer system linked by using information in data objects" (U.S. Pat. No. 6,553,129 issued on Apr. 22, 2003) and many others that are either patented or not patented. Certainly, each of them has some good functions and features that have some effect in protecting the data from the crimes of forgery, counterfeiting and piracy. However, there are still a number of problems in the current related technologies, apparatuses or methods. Some are not easy to use, some are too expensive to afford due to complicated supporting hardware and some are not powerful enough to prevent from the crimes of forgery, counterfeiting and piracy.

The good technologies and apparatus should have the features to able to protect any data in any kind of format effectively from the crimes of forgery, counterfeiting and piracy, i.e. unique, infeasible to break, impossible to forgery and cost-effective.

One of the important components of these technologies and apparatus is the encryption technology that plays a very key role in making the related technologies or tools with the highest level of security. In terms of encryption, identification, confidentiality, integration and authentication are four key conditions of a good and ideal encryption technology. The conventional encryption technologies such as DES, RSA, AES, PGP and others only meet with the parts of required conditions instead of all.

Along with the rapid development of computer technology, steganography as another new kind of encryption technology becomes more popular recently. But the main limitation of the steganography is its hiding capacity. Many can only hide about 15% of the original data, and very few may provide hiding capacities in excess of 50% of the original data. By now none of steganographic methods have an enough power to hide a data of up to 100%. This seriously limits the application scope of the steganographic methods. Besides hiding capacity, the security strength of the steganographic methods is still weak because the steganography mainly depends on the human vision system, so it hardly stops the astute hacker to break it. Thus, neither traditional encryption technologies and methods nor steganography methods are able to lead us to a best solution.

It is therefore an object of the present invention to find a new alternative solution that provides a system of information matrix cryptogram that can protect any data in any kind of format from the crimes of forgery, counterfeiting and pirating in an effective way.

It is another object of the present invention to design a special information matrix that can store any data file in any of kind of format. The information data matrix looks like a regular bitmap image, but actually it is a special coded data matrix as a cryptogram. It hides the original data in an information matrix cryptogram that is infeasible to break. The format of the data in the cryptogram will be totally different from its original format.

It is another object of the present invention to use a proprietary data allocation method to put the original data into a special data matrix that are ready for being compressed by using a lossless compressing technology such as LZ77, LZ78, LZW or others. It will have a good control of the size of data matrix without losing any information of the original data.

It is another object of the prevent invention to use a proprietary method to encrypt the data in a special coded information matrix. The IMC encryption technology will swap the columns and the rows in the data matrix in a totally random way at least 128 times or up to 1024 times according to the user's required level of strength of the encryption. In this way, the data matrix where the data is stored is converted into a cryptogram in a completely new format. The data in the cryptogram is protected in a very confidential and secured way. There will be no way to trace or decode the cryptogram without the right decoder key.

It is another object of the present invention to generate and append a unique authentic code to the cryptogram by using a special method with SHA-1 or SHA-256 or SHA-512 or any other similar technologies and store the authentic code to the last row of the special data matrix. Thus the decoder key can identify and authenticate the origin of the data reliably.

It is another object of the present invention to create a set of unique multi symmetric security key systems for different purposes. It comprises of three types of the security key systems, i.e. One-to-Many security key system for general use; One-to-One security key system for top confidential data and private use; Associated security key system for anti piracy and other special purpose.

It is another object of the present invention to design a special delivery system for transmitting security keys of the encoder or the decoder or their associated ID and password for decoding the steganographic image that is processed with special codes.

Furthermore, it is another object of the invention to allow the user to have many flexible applicable options that not only make many kind of products for different purposes to protect any data in any kind of format effectively, but also reduce the cost significantly.

SUMMARY OF THE INVENTION

In accordance with the present invention, there is provided a system of information matrix cryptogram with five integrated technologies with special features and functions to protect any data in any format from forgery, counterfeiting and pirating effectively. Five technologies comprise of data matrix technology, compression technology, encryption technology, data allocating technology and authentication technology. These technologies enhance the information matrix cryptogram with special features and functions up to the strongest level of security.

The concept of designing the system of the present invention is to be able to convert any data in any kind of formats and size into a special formatted and coded information matrix cryptogram in which the format of the data is totally different from its original format. This cryptogram with a special authentic code is unique and infeasible to break. The design of the open technology of the present invention allows the user to have flexible applicable options to protect the user's data in a very safe and secure way.

The system of the present invention comprises of six stages to generate an information matrix cryptogram. The stages are: 1. Define and design the data matrix; 2. Allocate the original data in the data matrix; 3. Compress the data file in the data matrix; 4. Encrypt the data in the data matrix; 5. Convert the data matrix into a cryptogram; 6. Generate and append the authentic code to the cryptogram.

BRIEF DESCRIPTION OF THE DRAWINGS

A complete understanding of the present invention may be obtained by reference to the accompanying drawings, when considered in conjunction with the subsequent, detailed description, in which:

FIG. 1. Structure of the System of Information Matrix Cryptogram

FIG. 2. Flowchart of Making of the Information Matrix Cryptogram

FIG. 3. Sample Diagram of the Size of the Data Matrix

FIG. 4a. Layout of the Data Matrix for the Information Matrix Cryptogram

FIG. 4b. Structure of the Data Matrix FILEHEADER

FIG. 4c. Structure of the Data Matrix INFOHEADER

FIG. 4d. Structure of the Color Table and the Color Index Array of the Data Matrix FIG. 4e. Data Allocation in the Data Matrix FIG. 5a Options of Three Types of the Encryption Methods FIG. 5b Flowchart of Encrypting a Data Matrix FIG. 5c. Sample diagram of the Allocation of the Encrypted Data in the Data Matrix before and after Swapping FIG. 6. Flowchart of the Multi Effect of Strengthening Encryption FIG. 7. Flowchart of Generating an Authentic Code FIG. 8. A Set of the Multi Security Key Systems of the Encoder and the Decoder FIG. 9. Flowchart of Delivering the Security keys of encoder and decoder FIG. 10. Flowchart of How the Security Key System Works For the purpose of clarity and brevity, like elements and components will bear the same designations and numbering throughout the FIGURES.

DESCRIPTION OF THE PREFERRED EMBODIMENT

Embodiments of the system of the present invention will be described one by one with reference to the accompanying drawings in the following ten sections:

Section 1: Structure of the System of Information Matrix Cryptogram

The system of the present invention enables the user to protect any data in any kind of format in a special coded information matrix cryptogram from forgery, counterfeiting, pirating in a desired level of security strength. The present invention integrates five technologies into one sophistically. The five technologies comprise data matrix technology, compression technology, encryption technology, data allocating technology and authentication technology.

FIG. 1 is a diagram showing the structure of the System of Information Matrix Cryptogram (thereafter referred as "IMC"). The system of the present invention comprises of three major parts i.e. the IMC encoder key, the making of Information Matrix Cryptogram and the IMC decoder key. The IMC encoder key and the IMC decoder key is a symmetric pair that always works together. The function of the IMC encoder key is to convert a data file to a cryptogram to protect the data by changing the format of the data totally different from its original format. The function of the IMC decoder key is to retrieve back the original data file from after the cryptogram to be decoded is verified and authenticated properly.

Section 2: Making of the Information Matrix Cryptogram

FIG. 2 is a flowchart of Making of the Information Matrix Cryptogram explicating a complete procedure of making a cryptogram. The procedure comprises of six stages, i.e. 1. Define and design a data matrix; 2. Allocate the data into the information data; 3. Compress the original data in the data matrix; 4. Encrypt the data in the data matrix; 5. Convert the data matrix into a cryptogram; 6. Generate and append authentic code to the information matrix cryptogram.

Each stage has its important role with special functions to assure that the data file to be processed in a logical and sophisticated way and thus the data file in the information matrix cryptogram will be protected effectively.

The first stage is to define and create an appropriate data matrix that can be used as a base for storing and processing data. This data matrix looks like the format of a regular bitmap, but in nature it is totally different from the traditional bitmaps. The data matrix is consisted of cells in order to meeting with the requirement and the use of the system of the present invention. Each cell will store 4 bits of data information. The minimum size of data matrix of the present invention will be 60×60 at least. It has 3600 cells that can store 1024 bytes data. The reason why the minimum size of the data matrix is required is to make the Information Matrix Cryptogram comply with the minimum required level of strength of security.

With reference to FIG. 3, there are three samples of the data matrix that are suggested for general use. The first one with 3600 cells (60×60) is for storing the size of data file of up to 1024 bytes. The second one with 6,760,000 cells (2600×2600) is for storing the size of data file of up to 3 megabytes. The third one with 6.25 million cells (25000×25000) is for storing the large size of data file of up to 298 megabytes.

Theoretically, there is no maximum size limit of the data matrix. The size of the data matrix will be decided based on the size of the actual data size. No matter what size of the data matrix is, the structure and making of any data matrix will be the same. The only difference between them is the size of the data matrix. For example, if using a computer with a speed of CPU of 2.0 GHz and 128 MB RAM, the size of the data should be within 298 megabytes, using the size of the data matrix with is 25,000×25,000 cells, otherwise if the size of a data file is too big, the processing time will be longer and the speed will be slower. However, if the computer system is powerful enough with the fastest speed of CPU of above 3.8 MHz and the RAM of above 2.0 G, any size of the data file can be processed without question.

Next, a detail description will be given about how a data matrix of the present invention is created.

As showed in FIG. 4a, the data matrix is divided into four chunks. Each of chunks stores the different information of the data. Like the traditional bitmap, there are FILEHEADER, INFOHEADER in the data matrix too. Chunk One is for FILEHEADER of the data matrix, Chunk Two is for INFOHEADER, Chunk Three is for color table and color index, Chunk Four is for the data file and an authentic code. In this special designed data matrix, one cell only stores four bits of the data information.

As showed in FIG. 4b, there are 14 bytes for FILEHEADER in Chunk One. The information in this chunk is all about the bitmap itself. The first two bytes are for type of the data matrix, next four bytes are for the size of the data matrix, the third four bytes are for the number of spaces of the data matrix has (among it two bytes for bfReserved1 and two bytes for bfReserved2, initial value set to zero), the fourth four bytes specify the byte offset from the beginning of the data file where the data starts.

As showed in FIG. 4c, there are 40 bytes for INFOHEADER in Chunk Two. The first four bytes (biSize) specify the size of the data matrix INFOHEADER structure; the second four bytes (biWidth) specify the width of the data matrix in pixels; the third fours bytes (biHeight) specify the height of the data matrix in pixels; the fourth 2 bytes (biPlanes) specify the number of planes in the data matrix (set to 1); the fifth 2 bytes (biBitcount) specify the depth of the data matrix (4 bit for one color); the sixth four bytes (biCompression) specify the length encoding to compress the data in the data matrix; the seventh four bytes (bisizeImage) specify the length of the image data in the data matrix (actual pixels) in bytes; the eighth four bytes (biXPelsPerMeter) and the ninth 4 bytes (biYPelsPerMeter) specify the resolution of the data matrix in pixel per meter (initial value set to zero); the tenth 4 bytes (biClrUsed) specify the number of colors of color table are used (initial value set to zero); the last four bytes (biClrImportant) tell which colors are most actually used (initial value set to zero).

As shown in FIG. 4d, there are 256 bytes in Chunk Three. An array of Color Table structures follows the bitmap information header structure. And this color table is followed by a second array of the indexes in the color table. The color-index array associates a color, in the form of an index to a Color Table structure, with each pixel in a data matrix. Thus the number of bits in color-index array equals the number of pixels times the number of bits needed to index the Color Table. In the present invention, color is a minute factor. More or less colors in the data matrix will not affect the features of the information matrix cryptogram at all. In order to control the size of the data matrix and increase the displaying speed, the data matrix only uses one cell for one color, i.e. 4 bits in one cell indexes one color.

Chunk Four, as shown in FIG. 4e, is the most important part of the data matrix in which the data file is stored. The Chunk Four is the biggest chunk in the data matrix. Its size is decided by the size of the original data file to be protected. The difference between the structure of the data matrix and the structure of the regular bitmap lies in the ways and format of storing and allocating of the data information. The purpose of doing so is to increase the difficulties for any one who attempts to break the cryptogram.

In Chunk Four, the first eight cells store the number of the rows of the data matrix; the second eight cells store the number of the columns of the data matrix, the third eight cells store the numbers in the last row. The following four cells store the number of total number of used cells for filename and the user's computer profile; another two cells store the number of the characters of filename; another two cells store the number of characters of the computer system profile. In the last row, there are 40 cells that are ready to store a 160-bit long authentic code. This is another special feature of the system of the present. With an authentic code, the Information Matrix Cryptogram can be verified and authenticated in a very reliable way. The way of creating an authentic code will be explicated in section 6.

After completion of creating the data matrix, the second stage is to allocate data in the data matrix. Firstly, the size the data matrix is decided by the size of the data file. For example, if the data file is 1 kilobytes (1024 bytes), we select the minimum size of the data matrix will be 60×60 (3600 cells) that can store 1800 bytes of data. In the data matrix, 14 bytes are for the information of FILEHEADER, 40 bytes for INFOHEADER, 256 bytes for color index and color table, 16 bytes for the information about the data, 20 bytes for the authentic code, and 1024 bytes for the data file itself. By far 1431 bytes are used and 369 bytes are remained. The remained 369 bytes will be replenished by a string of digits or letters randomly selected by the computer system. This example illustrates a complete procedure of creating how to create a data matrix and how to allocate the data in the data matrix. Any size of the data matrix allocates the data in the same way as the above example. The only difference is that the bigger size of the data will need a bigger size of the data matrix with more cells.

Section 3: Compressing the Data in the Data Matrix

The third stage is to compress the data in the data matrix. In order to control the size of the information matrix cryptogram within the required scope, the next important step of the system of the present invention is to compress the data in the data matrix. Through compression, the size of the cryptogram will be smaller or even less than 25% of the size of the original data file or a little bit bigger no more than the size of the original data file by 25%. This is an ideal compression result that the system of the present invention requires. The compression technology such as LZ77, LZ78 or LZW are highly recommended because they are all lossless compression technologies that can produce the desired compression result. If the other similar compression technology produces the same compression result, the system of the present invention can use it as an alternative method for compression.

Another reason of using lossless compression technology is to control the size of the data matrix in order to make the system work efficiently. The compression is a mandate component of the design of the system of the Information Matrix Cryptogram.

Section 4: Encrypting the Data in the Data Matrix

The fourth stage is to encrypt the data matrix. This will make the system enable to protect the data in a safe and secure way. The IMC encryption technology scrambles the cells where the information sits by a unique swapping method.

Referring now to FIG. 5a, it illustrates the options of three types of encryption methods to encrypt any data in the data matrix. The user can select an encryption method that he desires to encrypt the data in the data matrix. This design is a user-friendly and unique feature of the present invention. It makes the user feel much secure.

The first option (marked in FIG. 5a) is the default encryption method provided by the system of the present invention. If the user does not make a selection of the type of the encryption, the system will automatically use the default encryption method to encrypt the cryptogram. The default encryption is a low level of security for the general public use. The length of the security key will be less than 64 bits. The lifetime of the data file to be encrypted by default encryption is just days or weeks. The details about how to encrypt the data file by the default encryption method will be explicated later.

The second option (marked in FIG. 5a) will allow the user to use the existing encryption technologies such as 3DES, AES, RSA, PGP or any other encryption technology to encrypt the data in the data matrix bitmap. When he chooses option 2, the user can use any kind of the current existing encryption methods or his own technology to encrypt the data in the data matrix. This will make the user feel much secure and comfort to use the system of the Information Matrix Cryptogram.

The third option (marked in FIG. 5a) is using the IMC encryption technology of the system of the present invention to encrypt the data in the data matrix. The IMC encryption technology uses a unique swapping method to reformat the data matrix and then the data information is rearranged in a totally random order and this will make the cryptogram infeasible to break.

With reference to FIG. 5b, it describes how the IMC encryption technology works. The IMC encryption technology comprises of four steps to encrypt the data matrix, i.e. 1) create the seed for generating random number; 2) select a random number generator; 3) decide the random numbers for indexing the columns and the rows to be swapped; 4) swap the columns and the rows of the data matrix.

Step one is to create the seed for the random number generator. The system or the user creates a string of 32 bytes of digits or characters that are 256 bits long as a seed for the random number generator. The system of the present invention will automatically create a seed for generating the random numbers if the user does not create a seed himself. If the user creates a seed, this seed created will be treated as a kind of security code that will give more strength of the security to the cryptogram. SEED is a value that gets updated at each iteration. X is the "random" number returned at each iteration. A random number generator will be given a seed as an initial value of SEED to start with. In general, the generator falls into the category of linear congruent generators. The general form of a linear congruent generator is: Seed= (A*Seed+C) mod M; X=f(Seed). The user supplies an initial integer value for SEED. On each call to the random number generator a new value of SEED is calculated by taking the current value of SEED, multiplying by A, adding C, and taking the remainder MOD M of the result. The new value of SEED is an integer between 0 and M-1. This new value of SEED is then converted into a value X that is returned to the user.

Step Two is to select a random number generator. The system of the present invention only focuses on the random numbers for indexing to rows or columns of the data matrix. Any random number generator can be used unless it can generate the reliable and correct random numbers.

Step Three is to decide the random numbers indexing the columns and the rows to be swapped. So the range of the number we need is from one digit to 5 digits, e.g. x up to xxxxx. According to the current design of the data matrix, the maximum number of the rows or the columns does not exceed the 5 digits. That is why 5 digits of number is maximum limit. The system will take the number based on the size of the data matrix starting from the last digit of the random number.

Take 2600×2600 data matrix bitmap as an example, there are 2600 columns and 2600 rows. The number that is to be picked up will range from 1 to 2600. In actual picking of the random number, 1 and 2600 should be excluded. The length of the random number ranges from 1,000,000 to 100,000,000. The system of the present invention will take the numbers in a random sequence like this: 2, 34, 468, 78, 2100, 193, 476 1200 . . . . And then the system of the present invention will make the numbers in pairs randomly, e.g. 78 and 34 may be as a pair, 468 and 2 may be a pair, 2100 and 476 may be a pair, 193 and 1200 may be a pair. Each pair of the numbers will be used to index to either two columns or two rows that are to be swapped. For example, the pair of 78 and 34 indexes to Column 78 and Column 34, this means Column 78 and Column 34 will be swapped; the pair of 2100 and 476 indexes to Row 2100 and Row 476, this means Row 2100 and Row 476 will be swapped. This procedure will be repeated so on and so forth until the enough pair of columns or rows are swapped according to the required level of the security strength of the system of the present invention.

The last step is to swap the columns and the rows of the data matrix. The encryption actually begins from this step. The system of the present invention will use the pairs of random numbers indexing to the columns or the rows to swap the columns and the rows. According to the required level of the security, the times of swapping of the columns or the rows will be at least 128 times or up to 1024 times. Note, The swapping times will decide the level of security strength of the system. In another words, the more times to swap, the higher level of security strength to have. The system of the present invention only makes 1024 swapping times as the maximum limit because the swapping times over this limit will not increase the strength of the encryption significantly. 1024 times are good enough to ensure that the system of the present invention has a strong level of security. The probability to break the encrypted data matrix of strongest level of security strength may be one of $10^{77}$th. It will take much longer time or even lifetime for anyone who attempts to break the cryptogram without a right IMC decoder key.

Referring to FIG. 5b, it illustrates how the data is allocated in the data matrix before and after swapping. After swapping the columns and the rows, a new data matrix is produced. At this time, all contents and information related to the data file will be randomly stored in the data matrix. The swapping is executed in a totally random way. The format of the data in the cryptogram is completely different from its original format. No one will be able to predict where the cell sits and what information in which cryptogram cell hides. However, in real life, requirement for the strength of encryption is based on the lifetime of the data file. So it is important to select right level of security strength according to the lifetime of the data file to be protected. With reference to the following table, the user can select the proper level of the encryption key strength according to the lifetime of the data file. The shorter length of an encryption key is, the lower cost it is.

*A reference table for selecting the length of the encryption key

| Nature of Data | Lifetime of Data | Suggested Minimum (Symmetric) key length and swapping times |
|---|---|---|
| General data file | Minutes/hours | 32 bits to 64 bits 40-56 times |
| Product information | Weeks/months | 64 bits to 128 bits |
| Corporation information | | 56-100 times |
| Content of Test Paper | a couple of months | 128 bits/800 times |
| Business plan | years | 128 bits/800 times |
| Trading secrets | decades | 128 bits/800 times |
| Financial documents | double decades | 128 bits/800 times |
| Military Data | years/double decades | 128 bits-256 bits 800-1024 times |
| Top confidential data | triple decades | 128 bits-256 bits 800-1024 times |
| Personal records (ID, medical records, etc) | lifetime | 128 bits-256 bits or more 800-1024 times or more |

*The information provided in the above table is only for the reference use. The lifetime of a specific data should be carefully study in order to select right length of the encryption key and the times of swapping columns and rows.

Regarding making the default encryption of the system of present invention, the swapping times of the columns and the rows respectively are 40 times. This will comply with the minimum requirement of strength of 64-bit long encryption key.

Referring to FIG. 6, it gives a description how to produce a multi effect of strengthening Encryption. This is a unique feature of the system of the present invention that allows the user to encrypt the cryptogram where the data sits as many times as necessary. This can be called "Multi effect of strengthening encryption of the cryptogram". For some special needs, the user can have "double effect of encryption" or "triple effect of encryption" or "quadruple effect of encryption" and so forth. Furthermore, the system will also allow the user to produce the multi effect encryption by a different pair of the encoder key and the decoder key or simply use the same pair of the encoder key and the decoder key to encrypt the data matrix repeatedly. The way of taking the multi effect to strengthen encryption will make the cryptogram containing a data file infeasible to decode. Only all required decoder keys are at present and the cryptogram can be decoded. This will enhance the security strength of the information matrix security to the extremely high level of the security to meet with the special purpose. For example, for some important documents, they must be open by more than two persons together at the same time in order to ensure that top confidential documents are always in a strictly secure status. The Multi effect of strengthening encryption is perfect for this kind of use.

Section 5: Converting the Data File in the Data Matrix into a Cryptogram

In the sixth stage, with reference to FIG. 2, the system of the present invention starts to convert the data file into a cryptogram that is a special coded data matrix. The system will execute the conversion automatically. As a result, the format of the original data file in a cryptogram becomes totally different from its original format.

Section 6: Creating and Appending an Authentic Code to the Cryptogram

The final stage is to create and append an authentic code to the cryptogram by using the SHA-1 method or other similar technology. SHA-1, Secure Hash Algorithm, is a method to compute a condensed representation of a message or a data file. When a message of any length $<2^{64}$ bits is input, the SHA-1 produces a 160-bit output called a message digest. The SHA-1 is computationally infeasible to find a message which corresponds to a given message digest, or to find two different messages which produce the same message digest. Any change to a message in transit will, with very high probability, result in a different message digest, and the message will fail to verify.

With reference to FIG. 7, the first thing to do is to create a 160-bit long seed for generating an authentic code. There are two ways to create a seed in the system of the present invention. One way is to create a seed by the system of the present invention itself. Another way is to create a seed by the user himself. The system or the user will input a word string of characters or digits. This word string is 20 bytes long that can be digits or characters or the combination of digits and letters. After getting a seed, the system of the present invention will use the SHA-1 method to generate a first hash code of 160 bits long and as well use the SHA-1 to generate a hash code of the data in the first row of the data matrix. After having first two hash codes, the system will use an XOR operator to mix these two hash codes to generate a new hash code named Hash Code 1. By using an XOR operator to mix Hash Code 1 with the hash code of the data in the second row of the data matrix generated by using the SHA-1 method, Hash Code 2 will be generated. Again, by using an XOR operator to mix Hash Code 2 with the hash code of the data in the third row of the data matrix generated by using SHA-1 method, Hash Code 3 will be generated. The same procedure will be repeated again and again until by using an XOR operator to mix Hash Code N* with the hash code of the data in the last row of the data matrix by the SHA-1 method or other similar technology to generate the Final Hash Code. This final hash code will be the authentic code for an information matrix cryptogram. This authentic code will be stored in the last row. With the authentic code, the cryptogram will be able to be verified and authenticated in a very reliable way. The decoder key will not decode the cryptogram if the cryptogram is not original or altered. The way of making an authentic code of the system of the present invention is unique and completely different from the current existing methods of generating the authentic code. In this way, the unique authentic code in each cryptogram is not able to be infeasible to break and very reliable.

(* Hash Code N is the hash code that generated by the previous hash code mixed with the hash code of the data in the row before the last row in the data matrix bitmap.)

Section 7: A Set of the Multi Security key Systems of the Encoder and the Decoder Another most special feature of the system of the present invention is to make a set of the Multi Security Key Systems of the Encoder and the Decoder. The encoder key and the decoder key are a pair of symmetric encryption keys. They must always work in pairs. The encoder key is used to create a data matrix, allocate the data in the data matrix, compress and encrypt the data file in the data matrix, convert the data matrix into a cryptogram and authenticate the cryptogram. The decoder key works in a reverse way, i.e. to retrieve original data from the cryptogram after verifying and authenticating the cryptogram to be decoded properly.

Referring to FIG. 8, there are three types of security keys in this set of the multi security key system: 1. One-to-Many Security Key System (default); 2. One-to-One Security Key System; 3. Associated Security Key System. Each type of the security key systems has its unique function and role. The multi security key systems are not only powerful but also flexible. The user can choose an appropriate security key system according to the required level of security strength.

The One-to-Many security key system (Default) has a pair of the encoder key and the decoder key. Its encoder key can convert any data in any kind of format into a cryptogram and its decoder key can be used by as many as authorized viewers to retrieve the original data file in the cryptograms encoded by the encoder of its pair.

There is another powerful feature of the default key system. In order to protect the user's privacy and security, the decoder key and the encoder key of the default security systems of different persons or groups are not interchangeable at all, e.g. the Group A's decoder key will not be able to decode Group B's data file that is encoded by Group B's encoder. Each pair of One-to-Many encoder key and decoder key is independent and different from another pair. This feature will protect the user's privacy and security best.

To make each pair of the encoder key and the decoder key of the One-to-Many security key system unique and different from any other pairs is to assign a unique the extension name to the cryptogram file that is only recognized by its pair of encoder key and decoder key, e.g. Group A's has an exclusive extension name as "axd" for its cryptogram, while Group B's has another exclusive extension name of its cryptogram as "xyz", so Group A's decoder key will not recognize Group B's cryptogram, vice versa. The three letters of the extension name will be picked up randomly by the system of the present invention.

One-to-One security key system has strict limitation on the pair of the encoder key and the decoder key. Each pair of encoder key and decoder key of One-to-One security key system will only encode and decode the same data file and the user's computer profile if necessary, i.e. one data file has its exclusive pair of encoder key and decoder key. The way of making of the One-to-One security key system will assign a special code that contains the profile information of the data file to be protected to its pair of encoder key and encoder key. This special code will also automatically be added on the cryptogram. The decoder key of the One-to-One security system will check this special code in the cryptogram first before decoding. If the decoder key does not find the matched special code, the program will be terminated immediately. The special code may be generated by any method. However, the system of the present invention suggests using the data file to be encrypted as a seed and then use the SHA-1 method to create a special code. One-to-One security key system is perfect for encrypting the top confidential data files to protect user's privacy best.

The third type of the security key system is called the Associated Security Key System. The unique feature of the Associated Security Key system is to generate a unique decoder key associated with cryptogram that is encoded by the encoder key together with its paired decoder key. Only this associated decoder key can decode the cryptogram of this data file. For example, to convert a music file named eleventree.mp3 into a cryptogram by using the associated security key system, Two files will be generated: one is the coded music cryptogram file named eleventree.pav and the other one is an associated decoder key named eleventree.exe. The eleventree.pav can only be played by its associated decoder key of eleventree.exe. The advantage of making such a kind of the associated decoder key is used to protect the copyright of software, audio and video files effectively. It is a powerful tool to prevent from the crimes of piracy.

Section 8: The Delivery System of the Encoder Key and Decoder Key

It has been an unsolved problem of how to deliver the cipher key and decipher key in a secure and safe way. The present invention designs a delivery system including several methods for transmitting the encoder key and decoder key when necessary.

Referring to FIG. 9, the following steps should be followed to transmit the security keys: first, a encoder key or decoder key will be encrypted in a kind of steganographic images while its associated ID and a password will be generated at the same time. Any kind of image can be used as a steganographic media to hide the encoder key and/or the decoder key; second, the steganographic images where the encoder key or the decoder key is hidden can be downloaded from the sender's server or sent by the e-mail or other means. Third, the user retrieves the encoder key or the decoder key from the steganographic images and gets the associated ID and password separately. It will be very safe and secure to follow the above procedure to deliver an encoder key or a decoder key and associated ID and password.

The ID and password should be sent to the recipient separately via either voice media or other safe methods. The delivery system of the security keys makes it very difficult for anyone who is not an authorized person to get the real encoder key or decoder key or their associated ID and password.

As discussed previously, the steganography has limitation on capacity of hiding the information. However, it is still good enough for the system to use for delivering the encoder key and the decoder key because the size of the programs of the encoder key and the decoder key is very small. There is no special requirement for choosing a steganographic program. Any ready-made steganographic program or a customized steganographic program can be used as long as it can fulfill the task.

Section 9: The Working Mechanism of the System of Encoder Key and Decoder Key With reference to FIG. 10, this diagram illustrates how a pair of the encoder key and the decoder key work. The first thing to do is to get a data file ready that can be any kind of data in any format and any size. The decoder key will convert the data matrix bitmap into a cryptogram by going through the procedures as described in FIG. 2. All encoded cryptogram will be saved in a pre-made folder called "encodedfile". When decoding a cryptogram, the cryptogram should be checked first if it is original or not. The checking will be done automatically when the decoder program starts. If the cryptogram is not an original one, the warning message is displayed such as "This cryptogram is not original or altered. The program will be terminated." Then the program is shut down immediately. If the cryptogram is original, the original data file will be retrieved from the cryptogram and saved in a pre-made folder called "decoderfile".

There are another two features of the security key systems. One is that the decoded file will be deleted immediately after the program for viewing the data file is closed. This function can be turned on or off at the user's choice.

The other feature is to control the capability that the encoder key and the decoder key in order to limit the power of the pairs of the encoder key and decoder, and the system can limit the size of the data file that the encoder key or decoder key is able to deal with, e.g. if a pair of encoder key and encoder is limited to process the data files of the size of no more than 100K, and then this pair of keys will not be able to process size of any data file over 100K. This feature can help the user simply by controlling the power of the encoder key and decoder key to meet with other requirement of the security at the user's desire.

In conclusion, the system of the present invention uses a different method and open concept to make this alternative solution to resolve the current problems of encryption and authentication. By using the special encryption method and authentication technology, the system of the present invention ensures that the information matrix cryptogram unique, and infeasible to break. The design with the open concept allows the user to have flexible applicable options that not only secure the digital data file in an effective way, but also reduce the cost significantly.

The conventional encryption technology and methods only put a mask or a shell on the original data file. They are very vulnerable and once a portion of the encryption key is deciphered, the entire encryption will be broken easily. However, the system of the present invention changes the format of the original data file into a completely new format that is a compressed and encrypted information matrix with a special authentic code. It meets and exceeds all of the conditions of the encryption i.e. identification, confidentiality, integration and authentication. The strongest part of the system of the present invention is it its proprietary multi security key system. For different purpose, the user can choose the encryption methods according to his need. Any different pairs of the encoder key and the decoder key can be made for any according to the needs and use in the real world.

Section 10: Applicable Fields of the Present Invention

Embodiments of the system of the present invention illustrate the capability of the system to create and implement many applicable products of anti-forgery, anti-counterfeiting, anti-piracy, authentication and verification.

With its powerful and functional features, the system of the present invention can be applied in many industries including banks, stock and securities house, financial institutions, education institutions, medical institutions and hospital, etc. Here are some examples of the IMC application products such as The Bank Instrument Security System (BISS), The Certificate Authentication System (CAS), The Test Paper Security System (TPSS), The Medical Archive Security System (MASS), The Documents Security System (DSS), Music Copyright Protecting System (MCPS), Software Copyright Protecting System (SCPS), and Email Protection System (EPS).

The system of the present invention can also work together with some hardware such as the RFID or PDA equipment to make more useful and powerful products such as Anti-forgery Trademark/Sealer System (ATSS) and Anti-theft and Authentication System (ATAS). The above products are only part of the list.

In general, the system of the present invention can be a lead for developing many new powerful products for anti-forgery, anti-counterfeiting, anti piracy, authentication and verification. There is great potential to make many different products in the field of anti-forgery, anti-counterfeiting, anti piracy, authentication and verification by using the system of the present invention.

Having thus described a preferred embodiment of the Information Matrix Cryptogram, it should be apparent to those functions and certain advantages of the within system have been achieved. It should be appreciated that various modifications, adaptations and alternative embodiments thereof may be made within the scope and spirit of the this invention,

What is claimed is:

1. In a computing environment, implementing the method comprising:
   allocating original data into a data matrix;
   encrypting the data in said matrix;
   generating and appending a special authentic code to said matrix; and
   where said generating and appending a special authentic code to said matrix comprises:
   mixing an initial authentic code associated with data of a first row or column of said matrix with a first authentic code to generate a special authentic code 1, and mixing said special authentic code 1 with an initial authentic code associated with data of a further row or column to create a special authentic code 2.

2. The method of claim 1 where said data matrix comprises at least three chunks, and said method further comprises compressing the data.

3. The method of claim 1 where said step of encrypting the data includes at least one from the group consisting of swapping at least two rows of the matrix or swapping at least two columns of the matrix.

4. The method of claim 1 where said step of encrypting the data includes swapping at least two rows of the matrix and swapping at least two columns of the matrix.

5. The method of claim 4 where said rows and columns to be swapped are selected randomly and said swapping occurs at least 128 times.

6. The method of claim 4 where said encrypting the data comprises:
   assigning random numbers to columns and rows of said matrix;
   selecting at least two random numbers associated with two columns and at least two random numbers associated with two rows; and swapping said at least two columns and swapping said at least two rows.

7. The method of claim 4 where random numbers are assigned to columns and rows of said matrix, said random numbers created by providing numbers between 1,000,000 and 100,000,000 from a random number generator and using the last five digits of said randomly generated numbers between 1,000,000 and 100,000,000 for said assignment.

8. The method of claim 1 where said generating and appending a special authentic code to said matrix uses a Secure Hash Algorithm (SHA).

9. The method of claim 8 where said SHA is applied to most, if not all rows of the data matrix.

10. The method of claim 1, further comprising:
where encrypting said data in said matrix comprises:
pairing at least two random numbers;
indexing pairings of random numbers to columns or rows; and
swapping said indexed columns or rows.

11. In a computing environment, implementing the method comprising:
allocating original data into a data matrix;
encrypting the data in said matrix; and
generating and appending a special authentic code to said matrix, and
where said generating and appending a special authentic code to said matrix comprises:
mixing a hash code associated with data of a first row of said matrix with a first hash code to generate a Hash Code 1, and mixing said Hash Code 1 with a hash code associated with data of a further row to create a Hash Code 2.

12. The method of claim 11 where said mixing comprises using an XOR operator to mix respective hash codes.

13. The method of claim 11 where mixing repeats N times resulting in a Hash Code N.

14. The method of claim 11 where mixing uses sequential rows, starting with row 1 and ending with row N until said Hash Code N is generated.

15. The method of claim 13 where Hash Code N is stored in a row N of said matrix.

16. The method of claim 13 where Hash Code N is said authentic code.

17. The method of claim 11 where said hash code associated with data of a said first row and said further row of said matrix is generated by using SHA-1 techniques.

18. A system, comprising:
an allocation system for allocating original data in a data matrix;
an encryption system for creating a cryptogram of said original data in said data matrix;
an authentication system for creating and appending a code to said data matrix; and
an associated security key for generating unique symmetric encoder and decoder keys that are used in encoding and decoding, respectively, the cryptogram,
where said authentication system mixes an initial authentic code associated with data of a first row or column of said matrix with a first authentic code to generate a authentic code 1, and mixes said special authentic code 1 with an initial authentic code associated with data of a further row or column to create a special authentic code 2.

19. In a computing environment, implementing the method comprising:
mixing a hash code associated with data of a first row of a matrix with a first hash code to generate a Hash Code 1, mixing said Hash Code 1 with a hash code associated with data of a further row to create a Hash Code 2, and mixing continues until a Hash Code N−1 is mixed with a hash code associated with data of a row N to create a Hash Code N,
where mixing is sequential and starts with a row 1 and ends with said row N.

20. In a computing environment, implementing the method comprising:
allocating original data into a data matrix;
encrypting the data in said matrix; and
generating and appending a special authentic code to said matrix,
where said step of encrypting the data includes assigning random numbers to columns and rows of said matrix, selecting at least two random numbers associated with two columns and at least two random numbers associated with two rows, and swapping said at least two columns and swapping said at least two rows,
where said generating and appending a special authentic code to said matrix includes mixing a hash code associated with data of a first row of a matrix with a first hash code to generate a Hash Code 1, mixing said Hash Code 1 with a hash code associated with data of a further row to create a Hash Code 2, and mixing continues until a Hash Code N−1 is mixed with a hash code associated with data of a row N to create a Hash Code N,
where mixing is sequential and starts with a row 1 and ends with said row N.

* * * * *